United States Patent [19]

Grant

[11] Patent Number: 5,044,574
[45] Date of Patent: Sep. 3, 1991

[54] REEL HUB LATCH ASSEMBLY

[75] Inventor: Frederic F. Grant, Bellflower, Calif.

[73] Assignee: Datatape Incorporated, Pasedena, Calif.

[21] Appl. No.: 326,141

[22] Filed: Mar. 20, 1989

[51] Int. Cl.⁵ .......................... B65H 17/02; F16F 1/30
[52] U.S. Cl. ..................... 242/68.3; 267/158
[58] Field of Search .................. 242/68.3, 68.1, 56.9, 242/46.6; 267/180, 158, 160, 161, 163; 403/365, 372

[56]  References Cited
U.S. PATENT DOCUMENTS

| 2,088,703 | 8/1937 | Hubbard et al. | 267/161 X |
| 2,342,458 | 2/1944 | Davies | 267/161 X |
| 2,833,488 | 5/1958 | Kerber | 242/68.3 X |
| 3,222,884 | 12/1965 | Lyle | 242/68.1 X |
| 3,622,096 | 11/1971 | Young | 242/56.9 |
| 3,817,469 | 6/1974 | Mosciatti et al. | 242/68.3 |
| 3,833,181 | 9/1974 | Watkins | 242/68.3 |
| 4,109,878 | 8/1978 | Osawa | 242/68.3 |
| 4,279,386 | 7/1981 | Lobo et al. | 242/68.3 |
| 4,531,016 | 7/1985 | Duve | 267/180 X |
| 4,714,210 | 12/1987 | Howell | 242/68.3 X |

Primary Examiner—Daniel P. Stodola
Assistant Examiner—P. Bowen
Attorney, Agent, or Firm—William F.050476043 Noval

[57] ABSTRACT

Disclosed is a reel hub latch assembly used in magnetic tape recording/reproducing apparatus. The disclosed reel latch assembly accurately locates a reel on a hub and prevents slippage between the hub and reel when the reel is rotated to transport tape onto and off of the reel. The reel mounting hub has an annular groove containing an annular, U-shaped radial spring at the bottom of the groove. The radial spring has a plurality of circumferentially spaced fingers. An annular garter spring is located in the groove overlying the circumferentially spaced fingers of the radial spring. A magnetic tape reel, mounted on the hub, has a conical inner wall which is engaged by the garter spring. Preferably, the engaging portions of the spring are shaped to conform to the shape of the conical wall to reduce stresses on the reel.

4 Claims, 3 Drawing Sheets

REEL HUB LATCH ASSEMBLY

BACKGROUND OF THE INVENTION

This invention relates in general to magnetic tape recording/reproducing apparatus and, more particularly, this invention relates to an assembly for latching a magnetic tape reel to a hub so that the reel is accurately located on the hub and slippage between the reel and hub is prevented during rotation of the reel.

Magnetic tape recording/reproducing apparatus are widely used to record analog or digital information on tracks on magnetic tape. Generally, the magnetic tape is transported from one reel, past a magnetic head assembly, and onto another reel. Typically, the magnetic head assembly includes either stationary magnetic heads (which record and reproduce information on tracks which extend longitudinally of magnetic tape) or rotary magnetic heads (which record and reproduce information on slant tracks on magnetic tape). The reels between which the magnetic tape is transported are typically mounted either in a coplanar or coaxial relationship. In any case, it is desirable that a magnetic tape reel be accurately located on a hub and that slippage between the reel and hub be prevented during rotation of the reel. If a reel is not located accurately on the hub, then transport of tape onto and off of the reel may produce uneven tape packs and potential damage to the tape. Such damage results in degraded information being recorded on and reproduced from the tape. Moreover, if the reel slips relative to the hub during rotation of the reel with varying tape tension, resulting in recorded and reproduced information degradation.

Known arrangements for latching a reel to a hub have not been entirely successful. Thus, U.S. Pat. No. 2,833,488, issued May 6, 1958, Inventor Kerber, discloses an expansible core adaptor for mounting a core of web material upon a rotatable shaft. The core adaptor includes a cylindrical shaped body having a circumferential annular groove. A resilient, rubber O-ring is disposed in the groove and backs up a closely coiled garter spring which extends above the groove to radially engage the core. Because the inner surface of the core is smooth, this arrangement is disadvantageous because of the likelihood of axial slip between the core and the core adaptor. U.S. Pat. No. 4,109,878, issued Aug. 29, 1978, Inventor Osawa, discloses a cassette tape winding apparatus including a V-shaped groove formed on the inner circular surface of a reel. A hub (upon which the reel is mounted) has an annular circular groove. The groove contains a donut-shaped rubber tube and a circular spiral spring which extends into the V-shaped groove of the reel. The rubber tube is subject to degradation over the life of the apparatus, thus requiring time consuming and expensive replacement. U.S. Pat. No. 3,817,469, issued June 18, 1974, Inventors Moscitti et al, discloses a self-positioning reel-latching hub including a helical coil spring captured in a groove of the hub. The spring engages an inner edge of a tape reel to axially locate the reel relative to the hub. The engagement force is insufficient to prevent slippage of the reel relative to the hub when they are rotated. Instead, a complex latching arrangement is described to prevent slippage. None of the arrangements disclosed in these patents provide a simple, reliable and effective solution to the problem of latching a reel to a hub.

SUMMARY OF THE INVENTION

According to the present invention, there is provided a magnetic tape reel latch assembly which obviates the disadvantages of known latch arrangements. The reel latch assembly according to the invention is simple, reliable and effective in locating a reel in accurate axial position relative to a supporting hub and in preventing slippage between the reel and hub during rotation of the reel.

According to an aspect of the present invention, magnetic tape reel latch assembly comprises a rotatably mounted hub having an annular groove; an annular U-shaped radial spring located in the groove, wherein said radial spring has a plurality of circumferentially spaced fingers; an annular garter spring located in said groove overlying the circumferentially spaced fingers of said radial spring; and a magnetic tape reel mounted on said hub having a conical inner wall which is engaged by said garter spring. The radial spring fingers urge said garter spring into engagement with the reel to accurately locate the reel on the hub and to prevent slippage between the reel and hub. According to another aspect of the present invention, the garter spring is made from square spring wire which is shaped to conform to the circular shape of the conical wall of the reel, in order to reduce stress between the garter spring and reel.

According to a further aspect of the lpresent invention, a magnetic tape recording/reproducing apparatus includes a pair of spaced, coaxial reel hubs, upon which supply and take-up reels are latched by means of reel latch assemblies according to the present invention.

BRIEF DESCRIPTION OF THE DRAWINGS

In the detailed description of the preferred embodiment of the invention presented below, reference is made to the accompanying drawings in which like elements are provided with like numbers.

DETAILED DESCRIPTION OF THE PREFERRED EMBODIMENT

In the following description, preferred embodiments of the present invention will be described as used in coaxial reel type magnetic tape recording/reproducing apparatus. It will be understood, however, that the present invention may be used in any type magnetic tape recording/reproducing apparatus.

Figure 1:
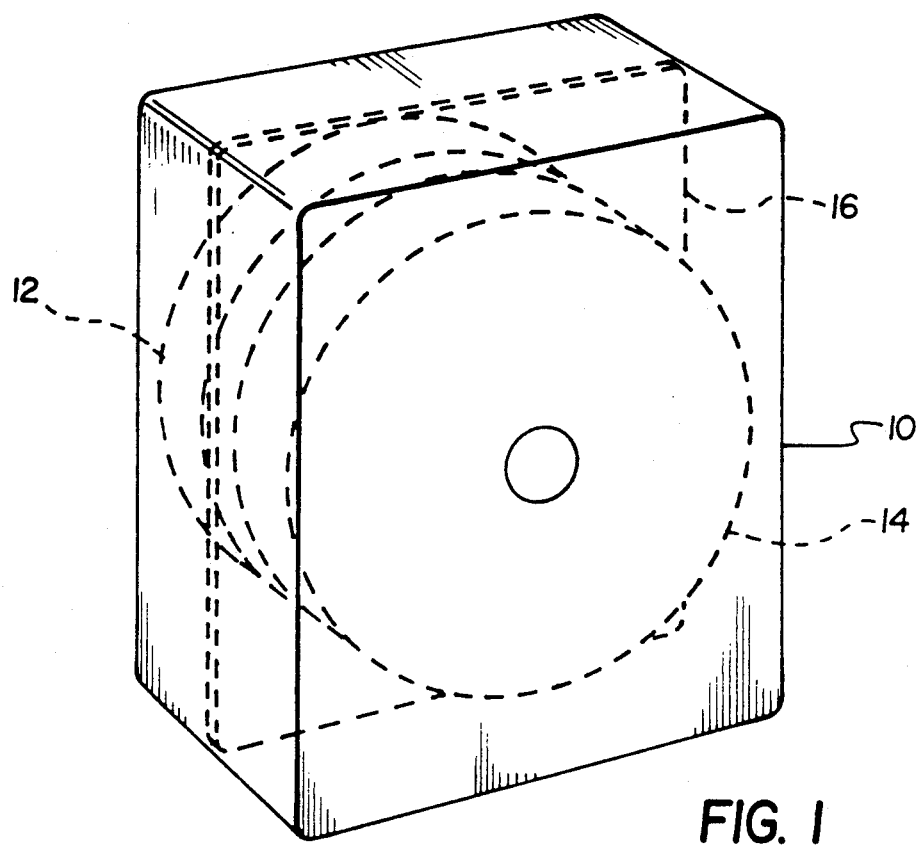
FIG. 1 is a perspective view of a cassette containing a pair of coaxial magnetic tape reels.
Figure 2:
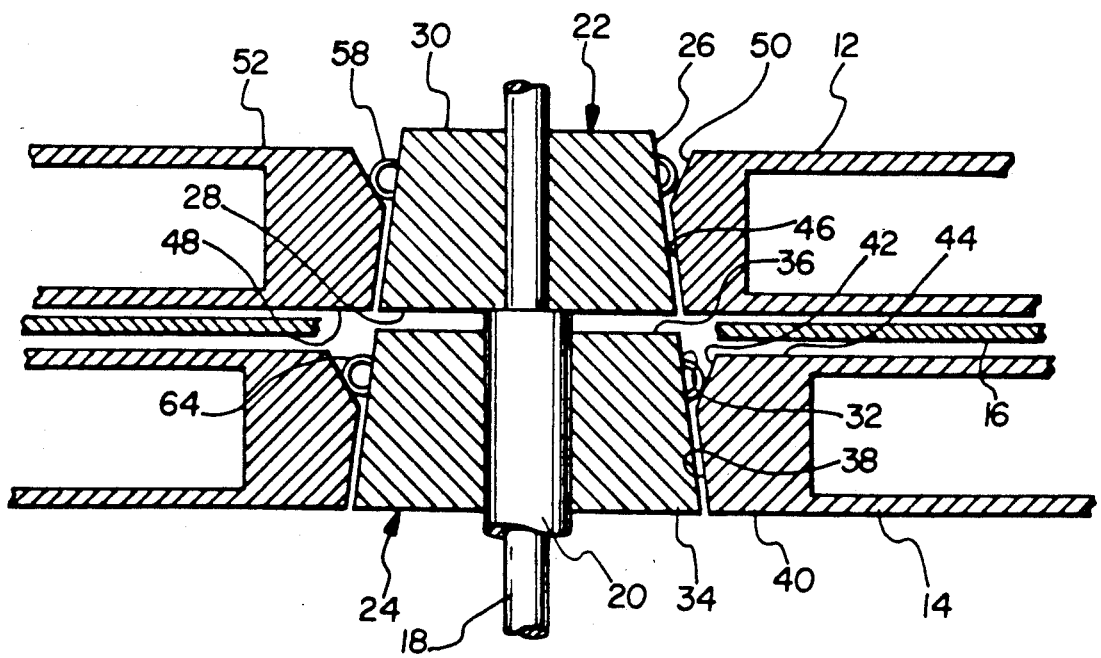
FIG. 2 is a diagrammatic, elevational view of a coaxial reel assembly including an embodiment of the present invention.

As shown in FIG. 1, a substantially rectangular cassette 10 includes coaxial magnetic tape reels 12 and 14 which are separated by center plate 16. Cassette 10 is replaceably mounted in a coaxial reel type, magnetic tape recording/reproducing apparatus. When the cassette is inserted into the apparatus, reels 14 and 12 are engaged by a drive system to transport magnetic tape off of one reel, past a magnetic head assembly, onto the other reel. As shown in FIG. 2, a tape drive system includes coaxial drive shafts 18 and 20 having respective hubs 22 and 24. Hub 22 has a conical wall 26 which tapers axially inwardly from end 28 to end 30. Similarly, hub 24 has a conical wall 32 which tapers axially inwardly from end 34 to end 36. The dimensions of conical wall 26 and conical wall 32 are such that the surface of wall 26 is substantially coextensive with an extension of the surface of wall 32.

Reel 14 has a first conical inner wall 38 opening out on face 40 of reel 14 and a second conical inner wall 42 opening out on face 44 of reel 14. Similarly, reel 12 has a first concical inner wall 46 opening out on face 48 of reel 12 and a second conical inner wall 50 opening out on face 52 of reel 12. Inner wall 38 of reel 14 is dimensioned to engage wall 32 of hub 14. Inner wall 46 of reel 12 is dimensioned to engage wall 26 of hub 22. Hub 22 is dimensioned to pass through the central opening of reel 14.

Figure 3:
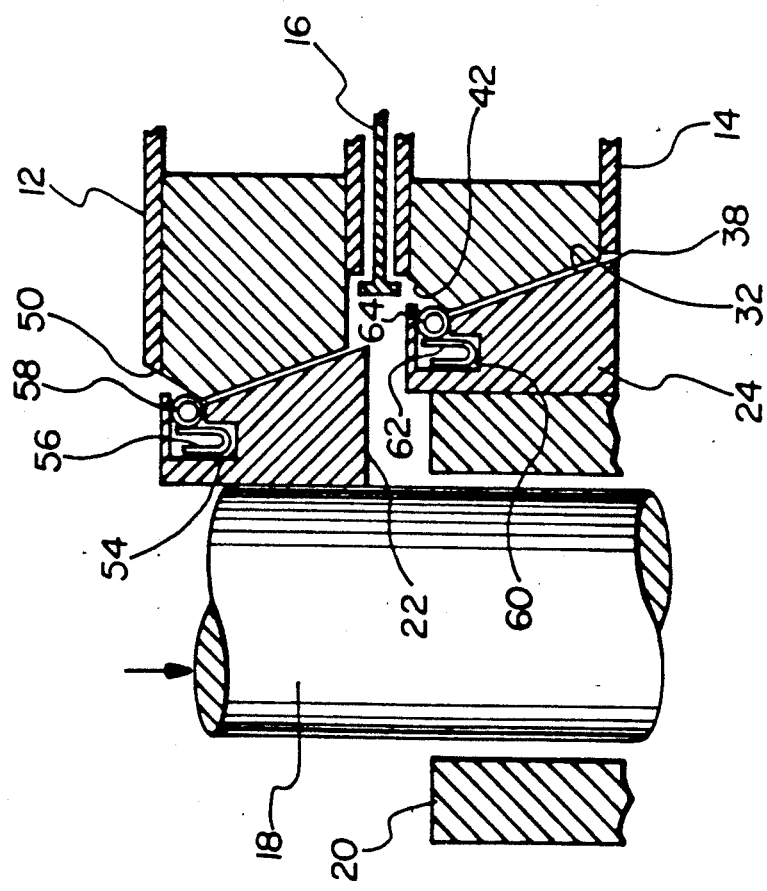
FIG. 3 is a partially sectional elevational view of a portion of the assembly of FIG. 2.

As shown in detail in FIG. 3, reels 12 and 14 are latched respectively to hubs 22 and 24 by reel latch assemblies according to the present invention. As shown, hub 22 has an L-shaped annular groove 54. An annular U-shaped radial spring 56 is located at the bottom of groove 54 and an annular garter spring 58 is located in groove 54 overlying spring 56. Spring 58 projects out of groove 54 and engages conical wall segment 50 of reel 12. Similarly, hub 24 includes annular L-shaped groove 60 in which is located annular U-shaped radial spring 62 and annular garter spring 64.

Figure 4:
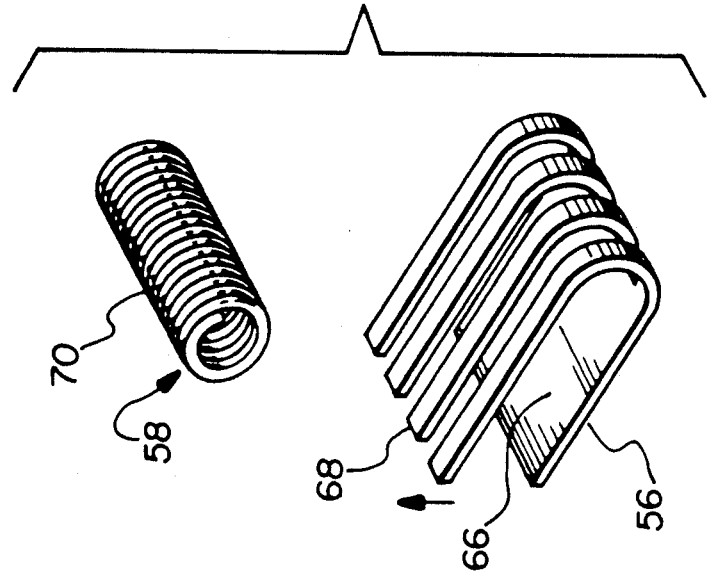
FIG. 4 is a partial perspective view of the radial spring and garter spring used in the embodiment shown in FIG. 3.

As shown more clearly n FIG. 4, spring 56 (spring 62) includes a lower solid segment 66 and a plurality of upper fingers 68. The fingers 68 of spring 56 exert a radial force on garter spring 58 which in turn exerts a radial force on inner wall 50 of reel 12. This force is applied circumferentially to urge inner wall 46 of reel 12 into engagement with wall 26 of hub 22. Thus, reel 12 is accurately located, in an axial direction, on hub 22 and slippage between reel 12 and hub 22 is prevented when reel 12 is rotated. Similarly, U-shaped spring 62 applies a radial force to garter spring 64 which engages the inner wall 42 of reel 14. As a result wall 38 of reel 14 is urged into engagement with the wall 32 of hub 24. Thus, reel 14 is accurately located, in an axial direction, on hub 24 and slippage between reel 14 and hub 24 is prevented.

Figure 6B:
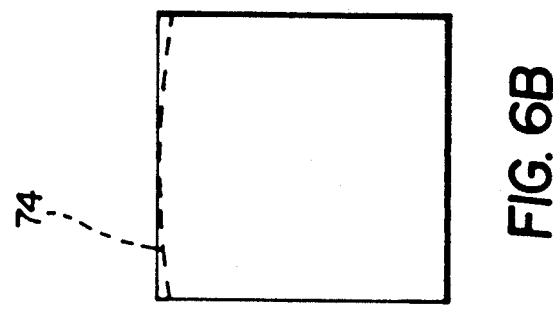
FIGS. 5, 6A and 6B are diagrammatic views illustrating another embodiment of the present invention.
Figure 5:
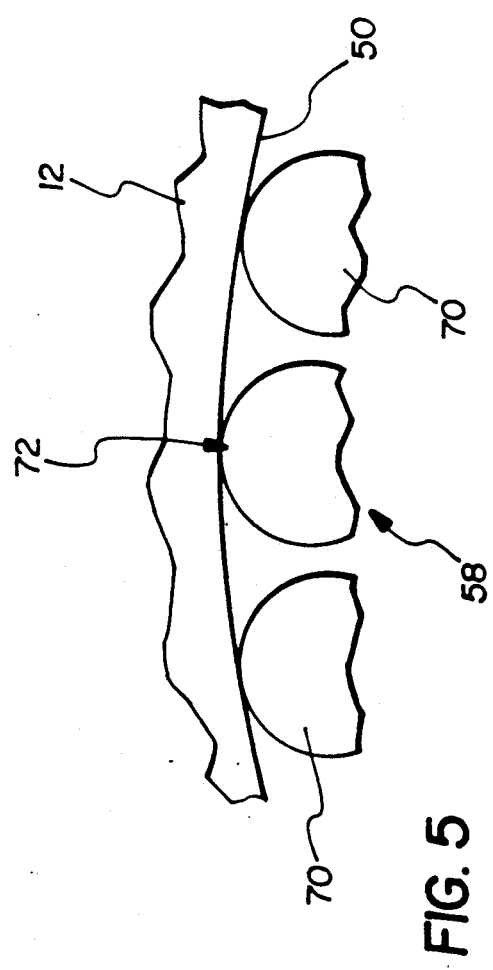
Figure 6A:
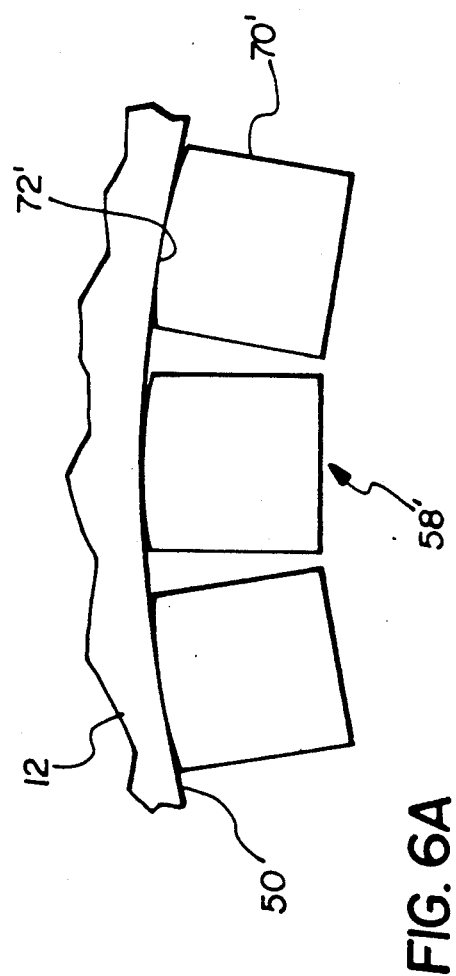

Referring now to FIGS. 5, 6A and 6B, there will be described another embodiment of the present invention. As shown in FIG. 5, spring 58 is formed from solid circular wire. The coils 70 of spring 58 engage the circular surface 50 of reel 12 at spaced regions of contact (such as at 72). In order to reduce the stress resulting from the radial force applied by spring 58 to reel 12, in the embodiment of the invention shown in FIGS. 6A and 6B, garter spring 58' is made of square spring wire which is shaped to conform to the circular shape of wall 50. Thus, the coils 70' of spring 58' engage surface 50 of reel 12 over a larger region of contact (such as at 72') which reduces the stress exerted on reel 12 and consequently reduces possible damage to reel 12. As shown in FIG. 6B, the square cross-section of the spring wire of spring 58' is shaped (as at dashed lines 74) to conform to the shape of wall 50.

The invention has been described in detailed with particular reference to preferred embodiments thereof, however, it will be understood that variations and modifications can be effected within the spirit and scope of the invention.

What is claimed is:

1. A magnetic tape reel latch assembly, comprising:
   a rotatably mounted hub having a concical wall which tapers axially outwardly from a smaller to a larger periphery, and having an annular groove at the smaller periphery thereof;
   an annular U-shaped radial spring located at the bottom of said groove, said radial spring having a plurality of circumferentially spaced fingers;
   an annular garter spring located in said groove overlying the circumferentially spaced fingers of said radial spring;
   a magnetic tape reel mounted on said hub, said reel having opposing faces and first and second divergent conical inner walls opening out on said faces, said second inner wall being dimensioned to engage said hub conical wall and said first conical inner wall adjacent to said groove, wherein said radial spring fingers urge said garter spring to engage said first conical inner wall of said reel to axially engage said second concical wall of said reel with said conical wall of said hub, and to prevent slippage between said reel and said hub.

2. The assembly of claim 1 wherein said annular garter spring is formed from square spring wire which is shaped to conform to the shape of said first conical inner wall of said reel to reduce the stress resulting from engagement of said spring with said reel.

3. In magnetic tape recording/reproducing apparatus, the invention comprising:
   first and second coaxially mounted hubs each of said hubs having a conical wall which tapers axially outwardly from a smaller to a larger periphery, such that the dimensions of said second hub conical wall are such that it is substantially coextensive with said first hub conical wall, and, each of said hubs has an annular groove at the smaller periphery of its respective conical wall;
   first and second annular U-shaped radial springs respectively located at the bottom of said grooves of said first and second hubs, each of said first and second radial springs having a plurality of circumferentially spaced fingers;
   first and second annular garter springs respectively located in said grooves of said first and second hubs overlying the circumferentially spaced fingers of said respective first and second radial springs;
   a first magnetic tape reel mounted on said first hub, said first reel having opposing faces and first and second divergent conical inner walls opening on said faces, said second inner wall being dimensioned to engage said hub conical wall and said first conical inner wall adjacent to said groove of said first hub, wherein said fingers of said first radial spring urge said first garter spring to engage said first reel to axially engage said second conical wall of said first reel with said conical wall of said first hub, and to prevent slippage between said first reel and said first hub; and
   a second magnetic tape reel mounted on said second hub, said second reel having opposing faces and first and second divergent conical inner walls opening on said faces, said second inner wall being dimensioned to engage said hub conical wall and said first conical inner wall adjacent to said groove of said second hub, wherein said fingers of said second radial spring urge said second garter spring to engage said second reel to axially engage said second conical wall of said second reel with said conical wall of said second hub, and to prevent slippage between said second reel and said second hub.

4. The invention of claim 3 wherein said first and second garter springs are respectively formed from square spring material which is shaped to conform to the shape of said first conical inner walls of said respective first and second reels to reduce the stress of engagement of said springs with said reels.

* * * * *